United States Patent
Staley et al.

(10) Patent No.: US 10,614,235 B2
(45) Date of Patent: *Apr. 7, 2020

(54) COLLECTION FOLDERS IN A CONTENT MANAGEMENT SYSTEM

(71) Applicant: Dropbox, Inc., San Francisco, CA (US)

(72) Inventors: Aaron Staley, San Francisco, CA (US); Aditi Jain, San Francisco, CA (US); Aisha Ferrazares, San Francisco, CA (US); Alicia Chen, San Francisco, CA (US); Ashish Warty, San Jose, CA (US); John Adams, San Francisco, CA (US); Joseph Hui, Berkeley, CA (US); Kathryn Siegel, San Jose, CA (US); Lennart Jansson, Seattle, WA (US); Matteus Pan, San Francisco, CA (US); Rob Baesman, Belmont, CA (US); Siyao Xu, Cambridge, MA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/221,556

(22) Filed: Jul. 27, 2016

(65) Prior Publication Data

US 2016/0335448 A1    Nov. 17, 2016

Related U.S. Application Data

(63) Continuation of application No. 14/530,555, filed on Oct. 31, 2014, now Pat. No. 9,430,669.
(Continued)

(51) Int. Cl.
*G06F 16/00*   (2019.01)
*G06F 21/62*   (2013.01)
(Continued)

(52) U.S. Cl.
CPC .......... *G06F 21/6218* (2013.01); *G06F 16/16* (2019.01); *G06F 16/176* (2019.01);
(Continued)

(58) Field of Classification Search
CPC ........... G06F 17/30011; G06F 21/6218; G06F 17/30115; G06F 17/30997;
(Continued)

(56) References Cited

U.S. PATENT DOCUMENTS 6,170,014 B1   1/2001   Darago et al.
7,444,390 B2   10/2008  Tadayon et al.
(Continued)

FOREIGN PATENT DOCUMENTS

JP   2004038579 A   2/2004
JP   2005070846 A   3/2005
(Continued)

OTHER PUBLICATIONS

"Student Drop box permissions" Forum in EduGeek of Edu website, http://www.edugeek.net/forums/how-do-you-do/9710-student-drop-box-homework-folder-permissions.html, Jul. 2007 (Year: 2007).*
(Continued)

*Primary Examiner* — Michelle N Owyang
(74) *Attorney, Agent, or Firm* — Fenwick & West LLP

(57) ABSTRACT

A content management system allows a user to create a collection folder to which a submitting user can add content items without being able to access content items added to the folder by other submitting users. A collection folder is created in a namespace of a collecting user and folder is made available to multiple submitting users to allow the submitting users to add items to the folder. When a submitting user first request to store a content item in the collection folder, the content management system creates a sub-folder associated with the submitting user in the collection folder
(Continued)

and stores the content item in the sub-folder. The submitting user is given rights to the sub-folder, but is not given rights to sub-folders created for other submitting users.

16 Claims, 3 Drawing Sheets

Related U.S. Application Data

(60) Provisional application No. 62/028,315, filed on Jul. 23, 2014.

(51) Int. Cl.
*G06F 16/16* (2019.01)
*G06F 16/176* (2019.01)
*G06F 16/242* (2019.01)
*G06F 16/33* (2019.01)

(52) U.S. Cl.
CPC ...... *G06F 16/2445* (2019.01); *G06F 16/3337* (2019.01); *G06F 21/6245* (2013.01); *G06F 2221/2141* (2013.01)

(58) Field of Classification Search
CPC ......... G06F 17/30165; G06F 17/30109; G06F 17/3028; G06F 16/16; G06F 16/176; G06F 16/2445; G06F 16/3337; G06F 21/6245; G06F 2221/2141
USPC ................................................. 707/600–899
See application file for complete search history.

(56) References Cited

U.S. PATENT DOCUMENTS

| | | | |
|---|---|---|---|
| 7,580,934 B2 | 8/2009 | Futatsugi | |
| 7,783,665 B1 | 8/2010 | Tormasov et al. | |
| 7,904,464 B2 | 3/2011 | Golwalkar et al. | |
| 8,566,903 B2* | 10/2013 | Kisin ................ | G06F 21/6218 382/275 |
| 8,719,173 B2* | 5/2014 | Beisty ................ | G06Q 10/10 705/300 |
| 2004/0049345 A1* | 3/2004 | McDonough ........ | G06Q 10/10 702/12 |
| 2005/0004928 A1* | 1/2005 | Hamer ................ | G06Q 10/10 |
| 2005/0080861 A1 | 4/2005 | Daniell et al. | |
| 2005/0246396 A1* | 11/2005 | Oreizy ............. | G06F 17/30067 |
| 2006/0080432 A1 | 4/2006 | Spataro et al. | |
| 2006/0224602 A1* | 10/2006 | Rawat ................ | G06F 16/16 |
| 2007/0005707 A1 | 1/2007 | Teodosiu et al. | |
| 2007/0067349 A1 | 3/2007 | Jhaveri et al. | |
| 2008/0005113 A1* | 1/2008 | Li ................ | G06F 17/30209 |
| 2008/0244591 A1* | 10/2008 | Sagara .............. | G06Q 10/109 718/102 |
| 2009/0144283 A1* | 6/2009 | Clark ............... | G06F 17/30144 707/999.01 |
| 2009/0199302 A1 | 8/2009 | So et al. | |
| 2010/0011448 A1* | 1/2010 | Wagner .............. | G06F 21/62 726/27 |
| 2011/0119594 A1 | 5/2011 | Tsao | |
| 2012/0131133 A1 | 5/2012 | Chen et al. | |
| 2012/0185779 A1 | 7/2012 | Dugan et al. | |
| 2012/0197980 A1 | 8/2012 | Terleski et al. | |
| 2012/0231438 A1 | 9/2012 | Fakhrai | |
| 2012/0233153 A1 | 9/2012 | Roman et al. | |
| 2013/0218829 A1 | 8/2013 | Martinez | |
| 2013/0332575 A1 | 12/2013 | Song et al. | |
| 2014/0047498 A1 | 2/2014 | Malegaonkar et al. | |
| 2014/0067865 A1* | 3/2014 | Kirigin .............. | H04L 63/10 707/783 |
| 2014/0067929 A1 | 3/2014 | Kirigin et al. | |
| 2014/0122471 A1 | 5/2014 | Houston et al. | |
| 2014/0122592 A1 | 5/2014 | Houston et al. | |
| 2014/0172799 A1 | 6/2014 | Dorman | |
| 2014/0181697 A1* | 6/2014 | Kirigin .............. | G06F 3/048 715/758 |
| 2014/0201138 A1 | 7/2014 | Dorman et al. | |
| 2014/0214694 A1 | 7/2014 | Shin et al. | |
| 2014/0215551 A1 | 7/2014 | Allain et al. | |
| 2014/0258350 A1 | 9/2014 | Duval et al. | |
| 2014/0258972 A1* | 9/2014 | Savage .............. | G06F 8/30 717/106 |
| 2014/0359465 A1* | 12/2014 | Litan Sever ........ | G06F 3/04817 715/738 |

FOREIGN PATENT DOCUMENTS

| | | |
|---|---|---|
| JP | 2008186239 A | 8/2008 |
| JP | 2008257475 A | 10/2008 |
| JP | 2009500698 A | 1/2009 |
| WO | WO 2004/077207 | 9/2004 |

OTHER PUBLICATIONS

Abazi-Bexheti, L.,"Development of a Learning Content Management System," WSEAS Transactions on Information Science & Applications, Jun. 2008, pp. 1001-1010, Issue 6, vol. 5.
Smetters, D.K. et al., "How Users Use Access Control," SOUPS 2009—Proceedings of the 5th Symposium on Usable Privacy and Security, 2009, Jul. 15, 2009-Jul. 17, 2009; Publisher: Association for Computing Machinery, 12 pages.
Bayardo, R. et al., "Exploiting the Web for Point-in-Time File Sharing," Special Interest Tracks and Posters of the 14.sup.th International Conference on World Wide Web, WWW'05, May 10, 2005, pp. 1016-1017.
Cozma, N., "Add expiration dates for shared Google Drive folders," CNET, Jan. 25, 2013, 3 pages, [Online] [Retrieved on Jul. 16, 2015], Retrieved from the Internet<URL:http://www.cnet.com/how-to/add-expiration-dates-- for-shared-google-drive-folders/>.
Egnyte v. Dropbox: "Comparing Dropbox and Egnyte White Paper," Jun. 30, 2013, 9 pages, [Online] [Retrieved on Jul. 16, 2015] Retrieved form the Internet<URL:http://pages.egnyte.com/rs/egnyteinc/images/Comparing_Dropbox_and_Egnyte.pdf>.
"Feature Request: Allow Different Permissions for Subfolder #4579," GitHub, Aug. 28, 2013, 8 pages, [Online] [Retrieved on Jul. 15, 2015] Retrieved from the Internet<URL:https://github.com/owncloud/core/issues/4579>.
PCT International Search Report and Written Opinion, PCT Application No. PCT/IB2015/053543, dated Jul. 31, 2015, 16 pages.
United States Office Action, U.S. Appl. No. 14/530,555, dated Jan. 14, 2016, 29 pages.
United States Office Action, U.S. Appl. No. 14/530,555, dated Jul. 9, 2015, 25 pages.
United States Office Action, U.S. Appl. No. 14/530,555, dated Feb. 5, 2015, 19 pages.
United States Advisory Action, U.S. Appl. No. 14/530,555, dated Oct. 19, 2015, 3 pages.
Extended European Search Report, European Patent Application No. 18162839.7, dated Apr. 20, 2018, 9 pages.

* cited by examiner

COLLECTION FOLDERS IN A CONTENT MANAGEMENT SYSTEM

CROSS-REFERENCE TO RELATED APPLICATIONS

This application is a continuation of U.S. patent application Ser. No. 14/530,555, filed Oct. 31, 2014, now U.S. Pat. No. 9,430,669, which claims the benefit of U.S. Provisional Application 62/028,315, filed on Jul. 23, 2014. Each of these applications is incorporated by reference herein in its entirety.

BACKGROUND

1. Field

The described embodiments pertain in general to content management systems, and more specifically to collection folders in which a user can store content items without being able to access content items stored by other users.

2. Description of the Related Art

There are certain situations when a person desires to collect content items (e.g., documents, videos, and photos) from multiple people. As an example, a teacher may want to electronically collect homework assignments from her students or a person may want to obtain vacation pictures from people that were on vacation with her. Typically, a person collects content items from other people by having them email the content items. However, collecting content items via email is a tedious process because the person has to go through each email, download the items, and store the items in one location.

SUMMARY

A content management system allows a user to create a collection folder to which a submitting user can add content items without being able to access content items added to the folder by other submitting users. When a user (collecting user) of the content management system requests to create a collection folder to which other users (submitting users) can add items, the content management system creates the folder in a namespace maintained by the system for the collecting user. The collection folder is made available to the submitting users.

When a submitting user request to store a content item in the collection folder, the content management system verifies that the content item satisfies folder criteria set by the collecting user for the folder. The folder criteria may include, for example, that stored content items be smaller than a certain size or that content items be added to folder prior to a certain time. If the content item satisfies the criteria, the content management system creates a sub-folder associated with the submitting user within the collection folder and stores the content item in the sub-folder.

The submitting user is given write rights to the sub-folder, which allow the submitting user to add additional items to the sub-folder. The submitting user may also be given read rights to be able to access items that submitting user has stored in the sub-folder. However, the submitting user is not given rights to sub-folders in the collection folder created for other submitting users. As a result, the submitting user cannot access those sub-folders or the content items stored in the other submitting users' sub-folders.

The collecting user can access each content item stored in the collection folder (the items in each sub-folder). In one embodiment, the collecting user can also share the collection folder with another user and provide the user with administrative rights that allow the user to access the content items in the collection folder.

Features and advantages described in this summary and the following detailed description are not all-inclusive. Many additional features and advantages will be apparent to one of ordinary skill in the art in view of the drawings, specification, and claims hereof.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
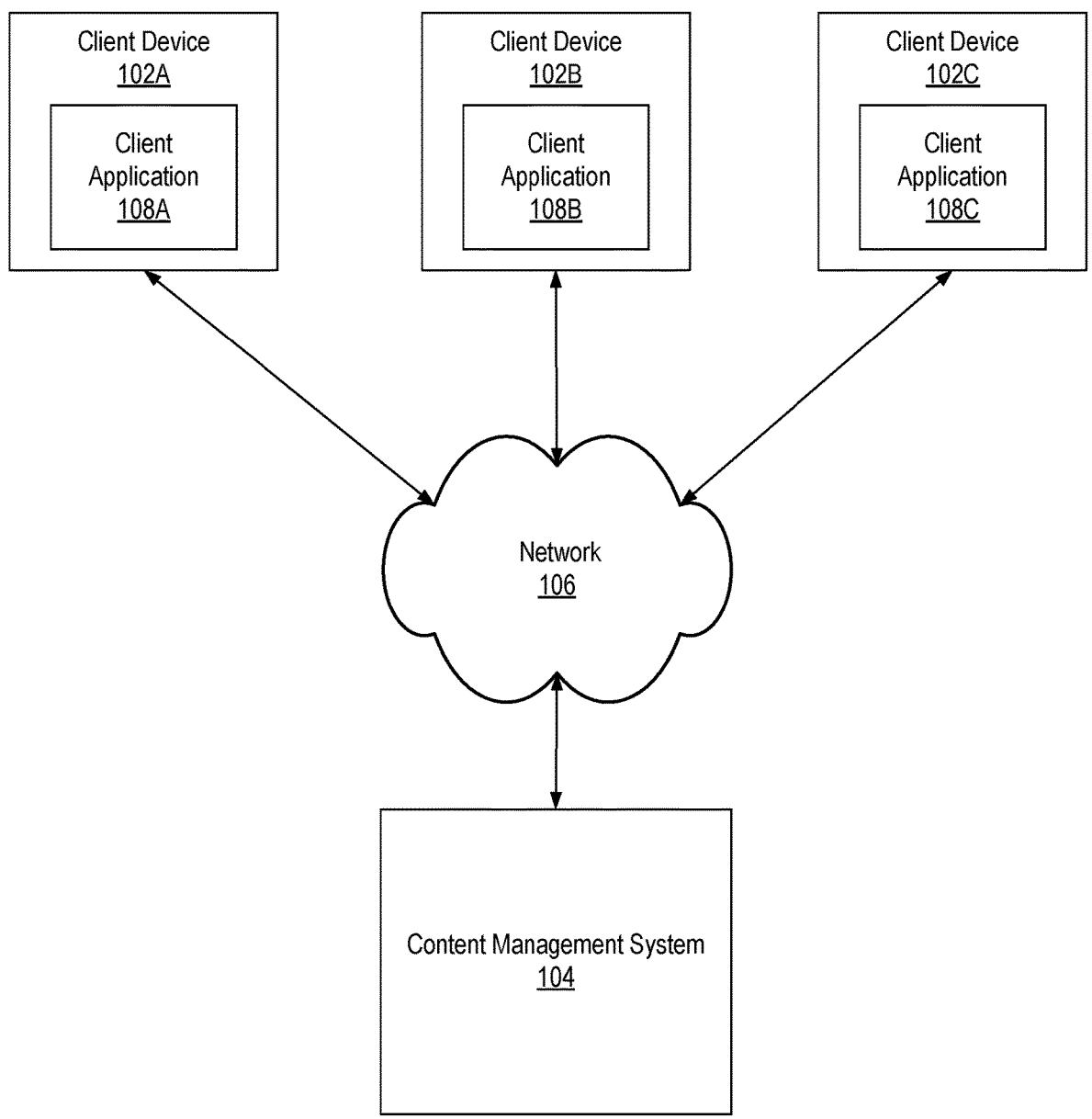
FIG. 1 is a block diagram of a content management system environment according to one embodiment.

FIG. 1 is a block diagram of content management system environment 100 according to one embodiment. Environment 100 includes client devices 102A, 102B, and 102C, and content management system 104 connected to a network 106. Although illustrated environment 100 only includes three client devices 102, other embodiments include additional client devices 102 (e.g., millions of client devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

A client device 102 is a computer system used by users to communicate with the content management system 104 via the network 106. A client device 102 may be, for example, a personal computer, a mobile phone, a tablet, or a personal digital assistant (PDA). Through a client device 102 users of content management system 104 can provide content items to content management system 104 for storage. A content item may include one or more of the following: digital data, audio, video, text, images, and documents.

Further, each client device 102 includes a client application 108 through which a user of the device can access a user interface to communicate with the content management system 104. The client application 108 can be, for example, a web browser or an application (e.g., mobile or desktop application) specifically designed to communicate with the content management system 104.

For a user having an account with the content management system 104, the client application 108 may store on the user's client device 102 a local copy of a namespace maintained for the user by the content management system 104. A namespace includes multiple content items. In one embodiment, a namespace is a root directory of a file system directory tree that includes one or more content items. The local copy of the namespace is synchronized with the namespace maintained by the content management system 104 for the user. Hence, the two namespace are organized the same, the namespaces include the same content items, and the content items are synchronized. For example, if a content item stored by the content management system 104 under the user's namespace is modified (e.g., edited, deleted, or moved between folders), the local copy of the content item is modified in the same way on the client device 102. Similarly, if a local copy of a content item in the client device's namespace is modified 102, the content item stored by the content management system 104 in the user's namespace is also modified.

Content management system 104 is a computer system that allows users to provide content items for storage and allows users to access stored content items. For each user that has an account with the content management system 104, the content management system 104 maintains a namespace for the user. A user can provide content items to the content management system 104 for storage under the user's namespace. Further, through a client device 102 a user can access content items stored by the content management system 104 under the user's namespace.

At the request of a user, the content management system 104 can create folders in the user's namespace for the inclusion of one or more content items. Folders serve as a way of organizing content items within a user's namespace. Conventional folders are read/write folders, meaning that the user can view (read) the content of the folder, and store (write) files in the folder. Another type of folder that can be created is a collection folder. A collection folder allows a user to collect content items from submitting users, where one submitting user cannot access content items uploaded to the collection folder by other submitting users. The submitting users can be users that have an account with the content management system 104 and users that do not have an account with the system 104. As an example, a teacher having an account with the content management system 104 may create a collection folder to collect homework assignments from students.

When a user having an account with the content management system 104 requests via a client device 102 to create a collection folder, the content management system 104 creates the collection folder in the user's namespace. A user requesting the creation of a collection folder is referred to as a collecting user. With the collection folder, the content management system 104 stores folder criteria provided by the collecting user to control the content items added by to the collection folder. The folder criteria may include, for example, restrictions as to the type of content items that may be stored in the folder (e.g., content item must be in a certain format) and an expiration time for the folder. After the expiration time, users can no longer store content items in the folder.

The content management system 104 also receives from the collecting user information associated with one or more users with whom the user would like to share the collection folder. The collecting user shares the folder with the users to allow them to add content items to the folder. Each of these users is to have write access to the collection folder. Write access allows a user to add content items to the folder but does not allow the user to access items added to the folder by other users. A user having write access to a collection folder is referred to as a submitting user.

In one embodiment, the information provided by the collecting user for each submitting user is an email address of the submitting user. Using the information provided by the collecting user, the content management system 104 sends a message to each collecting user. The message invites a collecting user to add/upload content items to the collection folder maintained by the system 104.

If a submitting user requests via a client device 102 to add a content item to the collection folder, the content management system 104 verifies that adding the content item to the folder satisfies the criteria set by the collecting user for the folder. If the criteria are satisfied, the content management system 104 creates a sub-folder within the collection folder and adds the content item to the sub-folder. The sub-folder is associated with the submitting user any additional items that the user requests be added to the collection folder are stored in the sub-folder. A message is sent to the submitting user notifying the user that the content item has been added to the sub-folder.

In some embodiments, the content management system 104 provides the submitting user with write rights to the sub-folder so that additional content items from the submitting user can be added to the sub-folder. The submitting user may also be given read and/or modifying rights to the sub-folder. Read rights allow the submitting user to access content items that were added by him to the sub-folder. Modifying rights allow the submitting user to edit (e.g., make changes or delete) content items that were added by him to the sub-folder.

Although the submitting user may have write, read, or modifying rights to the sub-folder created for the submitting user, the submitting user does not possess these rights to sub-folders created for other submitting users. Hence, the submitting user cannot see or access content items added to the collection folder by other users. In one embodiment, the content management system 104 does not even allow the submitting user to see that collection folder includes sub-folders for other users. In the example, of the teacher collecting assignments for her students. If a student uploads a homework assignment to the collection folder, other students would not be able to access it because the other student's would not have rights to the sub-folder created for the student.

At the request of the collecting user, the content management system 104 provides the collecting user with analytics information of the collection folder. The analytics information may include, for example, an indication as to how many submitting users have stored content items in the collection folder. Further, the content management system 104 allows the collecting user to have access to the content items that are added to collection folder by submitting users. Hence, the collecting user can access the content items in each sub-folder of the collection folder.

At the request of the collecting user, the content management system 104 can share the collection folder with a user and provide the user with administrative rights to the collection folder. Having administrative rights to the collection folder allows the user to perform similar actions to those of the collecting user (e.g., access items provided by some or all submitting users). The collecting user is able to control the level of administrative rights that the user possesses. Continuing with the teacher example from above, the teacher can give a teacher's assistant administrative rights to the collection folder to allow the assistant to access and grade the assignments submitted by the students.

Network 106 enables communication among the entities connected to it. In one embodiment, network 106 is the Internet and uses standard communications technologies and/or protocols. Thus, network 106 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, etc. Similarly, the networking protocols used on network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
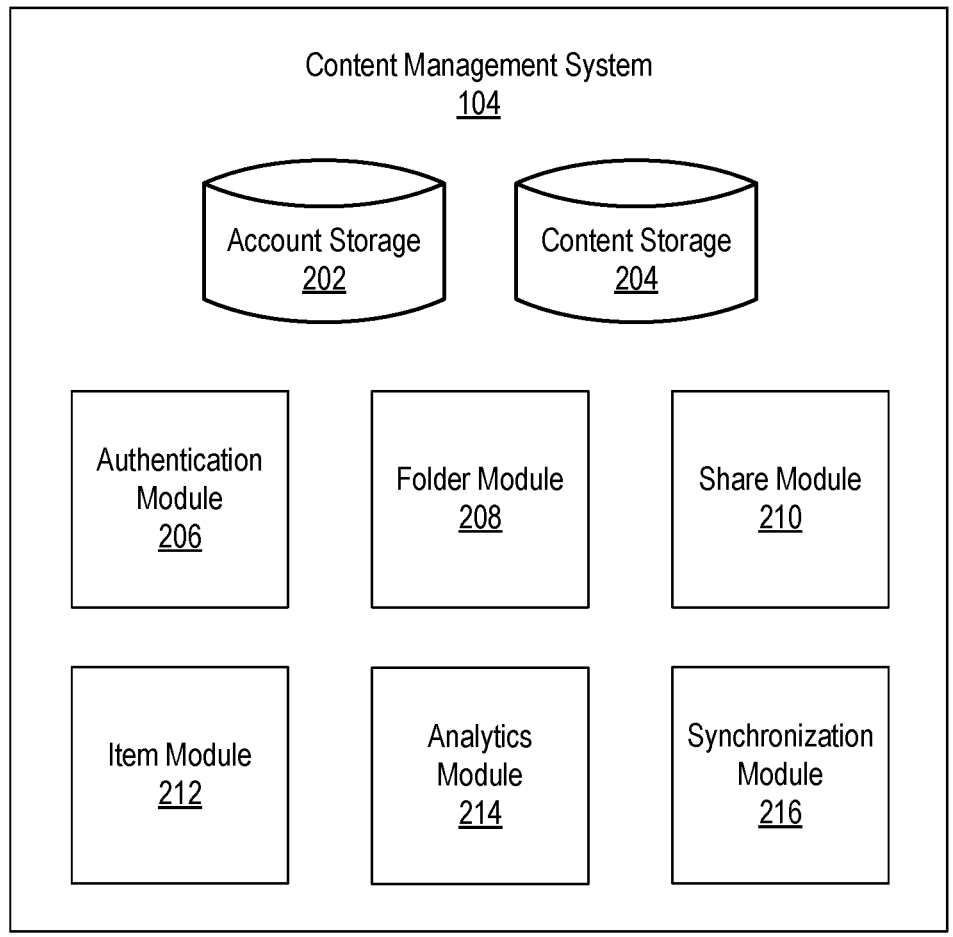
FIG. 2 is a block diagram illustrating modules operating within a content management system according to one embodiment.

FIG. 2 is a block diagram illustrating modules operating within the content management system 104 according to one embodiment. The content management system 104 includes an account storage 202, a content storage 204, an authentication module 206, a folder module 208, a share module 210, an item module 212, an analytics module 214, and a synchronization module 216. Those of skill in the art will recognize that other embodiments of content management system 104 can have different and/or other components than the ones described here, and that the functionalities can be distributed among the components in a different manner.

The account storage 202 stores information for each user that has created an account with the content management system 104. The information stored in the account storage 202 for a user may include personal information, such as name of the user, a communication identifier of the user (e.g., an email-address), authentication information (e.g., a username and password) used to authenticate the user, contact information for contacting the user, and payment information (e.g., a credit card number or a bank account number) for charging the user accrued fees. The information stored for a user may also include account information, such as the type of account the user has with the system 104 (e.g., free or paid account), maximum storage space allocated to the user, and amount of storage space being used by the user.

The content storage 204 stores content items provided by user for storage. In one embodiment, for each use that has an account with the content management system 104, the content storage 204 includes a namespace that stores content items uploaded by the user to the system 104 for storage and content items shared with the user. The content items included in a namespace may be organized into folders as directed by a user. A folder may also include one or more folders within it, which are referred to as sub-folders. Further, a user's namespace may include folders created by the user as well as folders shared with user by other users, as described in more detail below with reference to the share module 210.

The authentication module 206 authenticates users having an account with the content management system 104. When a user requests to perform certain actions, the authentication module 206 authenticates that the user has an account with the content management system 104. For example, a user may be authenticated when the user requests information of an account or access to the namespace maintained in the content storage 204 for the user.

In one embodiment, to authenticate a user, the authentication module 206 checks whether the user's device 102 includes a cookie with authentication information of the user. The authentication information may be, for example, an identifier of the user (e.g., email address or username selected by the user) and a password. If the client device 102 includes a cookie, the authentication module 206 verifies that the authentication information included in the cookie matches the information stored in the account storage 202 for the user. If the client device 102 does not include a cookie, the authentication module 206 instructs the client device 102 to present an interface to user through which the user can provide authentication information. When the user provides the authentication information via the interface, the authentication module 206 verifies the authentication information. In other embodiments, other methods may be used to authenticate a user, such as a client device 102 providing an authentication token assigned to the user.

In one embodiment, if a user has not previously created an account with the content management system 104 and requests to create an account, the user goes through a sign up process. The sign up process may include one or more of the following: the user providing authentication information to be used to authenticate the user, the user providing personal information, the user selecting the type of account he would like to open (e.g., a free account or a paid account that provides the user access to more storage space than a free account), and the user providing payment information. The information provided by the user during the sign up is stored in the account storage 202 by the authentication module 206.

The folder module 208 manages the creation of folders. A user requests to create a new folder via a user interface of client application 108, or via a web interface provided by the content management system 104. The folder module 208 creates the folder in the user's name space in the content storage 204 at the particular hierarchy and with the particular name supplied by the user. The folder may be included within an existing folder as a sub-folder. Additional description of namespace mapping is included in U.S. Pat. No. 8,825,597, incorporated by reference herein in its entirety.

In requesting the creation of a new folder, the user may request that the folder be a collection folder. As described above, a collection folder allows a collecting user to collect content items from submitting users, where one submitting user cannot access content items uploaded to the collection folder by other submitting users. In requesting that a collection folder be created, the collecting user provides folder criteria for controlling the storage of content items in the collection folder. In one embodiment, the folder criteria provided by the collecting user includes an expiration time for the collection folder. The expiration time is a date and time after which collecting users can no longer add items to the collection folder. For example, the expiration time can be a deadline set by a teacher for students to submit homework assignments. Other folder criteria may include that content items added to the folder be smaller than a certain size, that the content items be of a certain type (e.g., photos or in a certain format), restrictions as to times during which collecting users can submit content items (e.g., only between 9 AM and 5 PM), and a maximum number of content items that each user can store in the folder (e.g., one content items per user).

The folder criteria may further include restrictions as to which users can add items to the collection folder. For example, the collecting user may indicate that one or more of the following types of users can store content items in the collection folder: users that receive an invitation to submit content items, users having a certain password provided to them by the collecting user, and any user that access the collection folder via a reference (e.g., a uniform resource locator (URL)) associated with the folder. Other folder criteria may include that a content item submitted by a submitting user be added to the collection folder only if the collecting user authorizes the submission. For example, when a submitting user requests to add a content item to the collection folder, the collecting user is notified of the attempted submission. The content item is then added to the folder if the collecting user approves the submission.

In one embodiment, the collecting user can also request that copies of certain seed content items be automatically included in each sub-folder created in the collection folder. A submitting user associated with a sub-folder can modify the copies in the sub-folder. As an example, seed content items can be human resource forms (e.g., tax documents) that need to be completed by new hires. When a sub-folder is created in the collection folder for a new hire, copies of the forms are added to the sub-folder so that they can be completed by the new hire. Once they are completed, an administrator can retrieve the completed forms from the sub-folder.

The folder module 208 stores the folder criteria, an indication that the folder is a collection folder, and any seed content items provided by the user in the content storage 204 with the collection folder. The folder module 208 also stores information with the collection folder indicating that the collecting user has administrative rights to the collection folder. In one embodiment, the administrative rights include the collecting user be able to access each content item stored in the collection folder, modify content items in the folder, add content items to the folder (e.g., seed content items), modify folder criteria (e.g., the collecting user can change the expiration time of the folder), and access analytics information of the collection folder (e.g., the number of submitting users that have added content items to the collection folder).

The share module 210 allows the sharing of folders with users. A folder being shared with a user signifies that the user has some type of rights to the folder, such as rights to add content items to the folder, read content items in the folder, or modify content items in the folder. A folder can be shared with users that have accounts with the content management system 104 and with users that do not have accounts.

In one embodiment, when a collecting user creates a collection folder, the collecting user indicates one or more submitting user with whom the user would like to share the collection folder. The collecting user provides a communication identifier for each submitting user that can be used to communicate with the user. In one embodiment, the communication identifier is an email address. In other embodiments, the communication identifier is a telephone number or an identifier of a user with an instant messaging service.

The share module 210 creates a message to send to each submitting user inviting the submitting users to store content items in the collection folder. In one embodiment, the messages include a reference (e.g., a URL) to the collection folder that allows a submitting user to access an interface for adding content items to the folder. In one embodiment, the same reference is included in each message. In another embodiment, the reference included in each collecting user's message is unique to the submitting user. By including a unique reference with each message, the content management system 104 is able to distinguish between different submitting users when they communicate with the system 104 to submit content items. In one embodiment, the share module 210 only includes references to the collection folder in messages to submitting users that do not have an account with the content management system 104. The share module 210 sends the created messages to the submitting users using the communication identifiers provided by the collecting user.

In one embodiment, the share module 210 stores the communication identifiers of submitting users in the content storage 204 with the collection folder. If unique references were created for each submitting user, the unique references are also stored by the share module 210. In one embodiment, the share module 210 additionally stores with the collection folder information indicating that each submitting user has write rights to the folder. Write rights allow a submitting user to add content items to the collection folder, but do not allow the user to access items added to the folder by other submitting users.

Additionally, the share module 210 determines whether any of the submitting user's has an account with the content management system 104. To make the determination, for each submitting user, the share module 210 checks whether the communication identifier provided for the user is included in the account storage 202. If the communication identifier is included in the account storage 202, the share module 210 identifies the submitting user and the user's namespace in the content storage 204. The share module 210 adds the collection folder to the submitting user's namespace. Adding the collection folder to the submitting user's namespace allows the user to see that the folder has been shared with the user when the user accesses his namespace. Additionally, by the submitting user's namespace including the collection folder the submitting user can conveniently add content items to folder without having to provide a reference to the folder, such as a reference included in an invitation sent to the submitting user.

If the collecting user requests to share the collection folder with a user and to provide the user (administrative user) with administrative rights, the share module 210 stores with the collection folder an indication that the administrative user has administrative rights and which specific administrative rights the collecting user granted the administrative user. The administrative rights that can be granted by the collecting user include the administrative user being able to access each content item added stored in the collection folder (or items stored in specific sub-folders of the collection folder), modify content items in the folder (or items in specific sub-folders), add content items to the folder (or items to specific sub-folders), modify folder criteria, and access analytics information for the collection folder. In one embodiment, the share module 210 sends a message to the administrative user notifying the user that the collection folder has been shared with him and that the user has administrative rights to the folder. Further, if the administrative user has an account with the content management system 104, share module 210 adds the collection folder to the user's namespace in the content storage 204.

The item module 212 processes requests from users related to existing collection folder. The item module 212 receives requests from users to add items to collection folders. When a user requests to add a content item to a collection folder (e.g., via a reference of the collection folder or via their namespace), the items module 212 determine whether the collection folder's expiration time has passed. If the expiration time has passed, the item module 212 denies the request. On the other hand, if the expiration time has not passed or if not expiration time is set, the item module 212 obtains identifying information of the user. In one embodiment, the identifying information is a name of the user and a communication identifier of the user (e.g., an email address). If the user has an account with the content management system 104 and the authentication module 206 has authenticated the user, the item module 212 obtains the identifying information of the user from the account storage 202.

If the user does not have an account with the system 104, the item module 212 sends a request to the user's client device 102 that the user provide the identifying information. In one embodiment, if a unique reference to the collection folder was provided to the user in a message and the user used the unique reference to make the request, the item module 212 can obtain at least part of the identifying information of the user based on the information that is stored with the folder. For example, the item module 212 may be able to obtain the communication identifier because it is stored in association with the reference.

In one embodiment, when the user provides the identifying information, the item module 212 performs a vetting process to verify at least part of the identifying information. The item module 212 verifies at least part of the information so that a user cannot fraudulently submit items with someone else's identity. In one embodiment, in the vetting process, the item module 212 verifies that the communication identifier provided by the user belongs to the user. In one embodiment, to verify the communication identifier, the item module 212 sends a message to the communication identifier with verifying information (e.g., a randomly created character string, a password provided by the collecting user, or URL). If the user provides the verifying information included in the message, the identifying information is considered verified by the item module 212.

Once the identifying information of the user is obtained and verified if necessary, the item module 212 determines whether the user has write rights to the collection folder and whether adding the content item satisfies the folder criteria provided by the collecting user for the folder. If the user does not have write rights or adding the item does not satisfy the folder criteria, the item module 212 denies the user's request. On the other hand, if the user has write rights and folder criteria are satisfied, the item module 212 determines whether a sub-folder is already included in the collection folder for the user.

If the collection folder includes a sub-folder for the user, the item module 212 adds the content item to the sub-folder. If the collection folder does not include a sub-folder for the user, the item module 212 creates the sub-folder within the collection folder in the content storage 204 and associates the sub-folder with the user. The item module 212 adds the content item to the sub-folder associated with the user. The item module 212 sends a message to the user indicating that the content item has been added to the collection folder.

In one embodiment, when adding the content item to the sub-folder, the item module 212 includes with the content item date information indicating when the content item was stored in the sub-folder. In one embodiment, the item module 212 stores with the sub-folder in the content storage 204 information indicating that the user has write right to the sub-folder. The item module 212 may also store that the user has read and modifying rights to the sub-folder. In one embodiment, the user loses the any write, reads, and modifying rights after the expiration time of the collection folder.

In another embodiment, the user loses write and modifying rights, but retains read rights to be able to view submitted content items.

When a user requests to access a sub-folder or an item included in a sub-folder of a collection folder, the item module 212 identifies the identifying information of the user. Based on the identifying information and the information stored in the content storage 204, the item module 212 determines whether the user has rights for the sub-folder or administrative rights that allow the user to perform the requested action. If the user does not have the appropriate rights, the request is denied by the item module 212. On the other hand, if the user has the rights, the item module 212 performs the requested action.

The analytics module 214 generates analytics information for collection folders. When a user with the appropriate administrative rights requests analytics information for a collection folder, the item module 212 generates the analytics information and sends the information to a client device 102 of the user for display. The analytics information is generated by analyzing the collection folder in the content storage 204. In one embodiment, the analytic information generated by the item module 212 includes a number of users that have submitted content items for the collection folder. The item module 212 determines the number by counting the number of sub-folders in the collection folder. Additional analytics information may also include the number of potential submitters, which is determined based on the number of invitations sent out by the share module 210 for the collection folder. Other analytics information that may be generated for the collection folder is a list of names of users that have stored content items in the folder and a breakdown of different times that user submitted content items.

The synchronization module 216 synchronizes changes to folders across systems. A folder may be changed, for example, when a user modifies a content item in the folder or reorganizes a folder (e.g., the hierarchy of the folder). When a folder is modified in a namespace stored in the content storage 204 or in a local copy of a namespace on a client device 102, the synchronization module 216 identifies the modifications made to the folder. The synchronization module 216 sends instructions to client devices 102 that include out-dated versions of folder to make the identified modifications. Further, if the content storage 204 includes an out-dated version of the folder, the synchronization module 216 makes the identified modifications to the folder in the content storage 204. Additional description of folder synchronization is included in U.S. Pat. No. 8,825,597.

Figure 3:
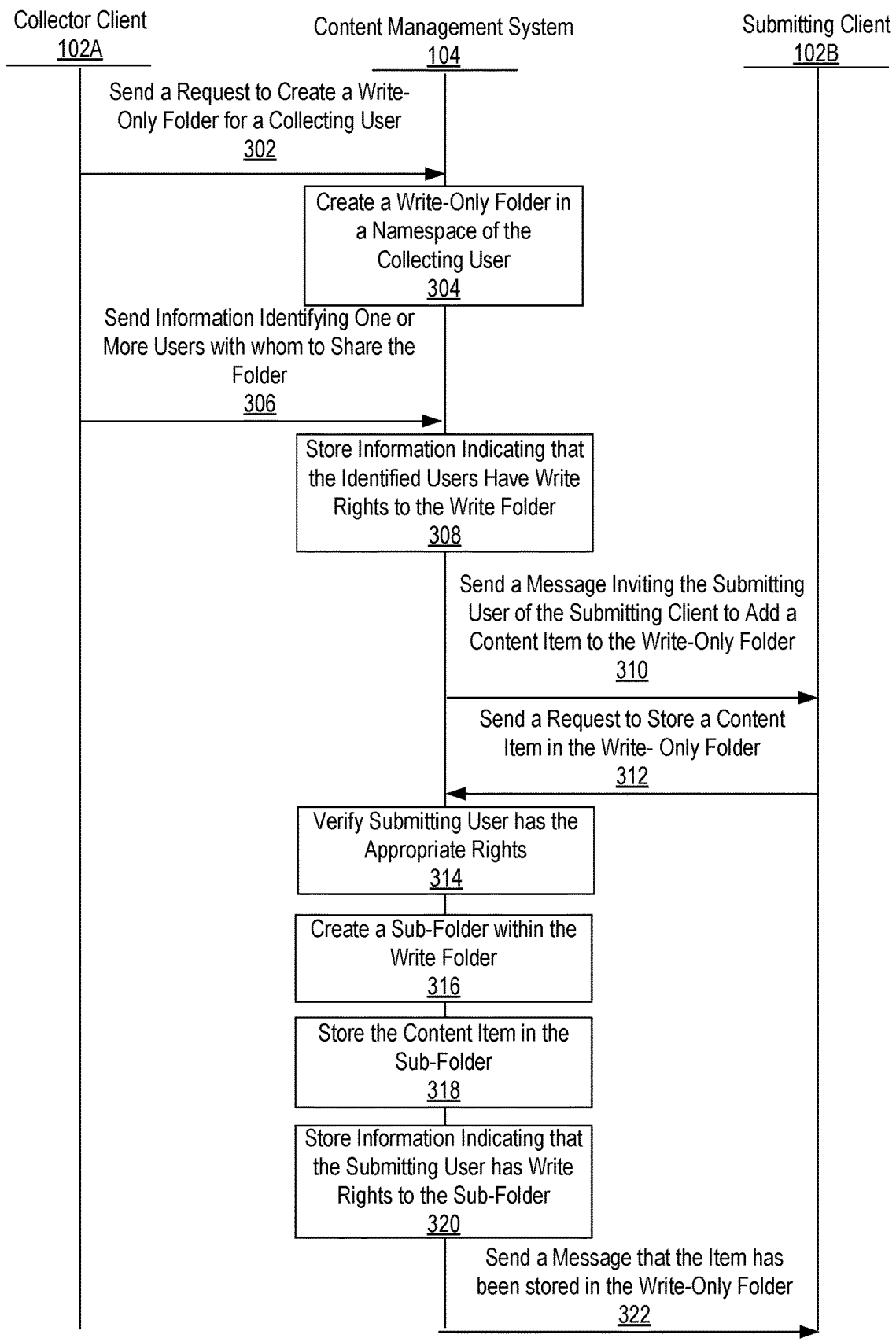
FIG. 3 is an interaction diagram of a process for a collecting user to facilitate obtaining content items from submitting users according to one embodiment.

FIG. 3 is an interaction diagram of a process for a collecting user to facilitate obtaining content items from submitting users according to one embodiment. The interaction diagram illustrates the steps performed by a client device 102A (may also be referred to as the collector client) operated by a collecting user, the content management system 104, and a client device 102B (may also be referred to as the submitting client) operated by a submitting user.

Those of skill in the art will recognize that other embodiments can perform the steps described below for FIG. 3 in different order. Moreover, other embodiments can include different and/or additional steps that the ones described Assume for purposes of this example that the collecting user has an account with the content management system 104 and that the content management system 104 maintains a namespace for the collecting user. At the request of the collecting user, the collector client 102A sends 302 a request to the content management system 104 that a collection folder be created for the collecting user. The content management system 104 creates 304 the collection folder in the namespace of the collecting user. The system 104 may also store folder criteria provided by the collecting user for the folder and an indication that the collecting user has administrative rights to the folder.

The collector client 102A also sends 306 to the content management system 104 identifying information of one or more user with whom the user would like to share the collection folder. At least one of the users is the submitting user operating the submitting client 102B. The content management system 104 stores 308 with the collection folder information indicating that the one or more users have write rights to the folder.

The content management system 104 sends 310 a message to the submitting client 102 inviting the submitting user to add a content item to the collection folder. At the request of the submitting user, the submitting client 102B sends 312 a request that the content management system 104 store a content item in the collection folder. The content management system 104 verifies 314 that the submitting user has the rights to store the content item in the collection folder. The content management system 104 creates 316 a sub-folder in the collection folder for the submitting user and stores 318 the content item in the sub-folder.

The content management system 104 stores 320 information with the collection folder indicating that the user has write rights to the sub-folder. The submitting user is not given rights to sub-folders created for other users in order to prevent the submitting user from accessing or modifying content items stored by the other users and to prevent the submitting user from adding content items to the other users' sub-folders. The content management system 104 sends 322 a message to the submitting client 102B indicating that the content item has been stored in the collection folder.

Additional Considerations

The foregoing described embodiments have been presented for the purpose of illustration; they are not intended to be exhaustive or to limiting to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, described modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include one or more general-purpose computing devices selectively activated or reconfigured by one or more stored computer programs. A computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Described embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
creating and storing, in a computer-readable storage medium by a content management system implemented in a cloud computing system, a collection folder associated with a collecting user account;
receiving, from a collecting user associated with the collecting user account, information identifying a plurality of potential submitting users;
responsive to receiving the information, sending, to each of the plurality of potential submitting users based on the information, an electronic invitation to upload a content item to the collection folder;
identifying, based on electronic responses to the invitation, a plurality of submitting users;
receiving, from each respective submitting user of the plurality of submitting users, an upload of a respective content item to add to the collection folder;
responsive to receiving each respective content item, creating, in the collection folder, a respective unique sub-folder for the respective submitting user; and
providing the respective submitting user with access rights to the respective unique sub-folder, the access rights specifying that the respective submitting user can write to the respective unique sub-folder and cannot write to or view contents of any other sub-folder in the collection folder.

2. The method of claim 1, further comprising:
granting the collecting user account read rights to each submitting user's sub-folder created within the collection folder.

3. The method of claim 1, further comprising:
associating an expiration date with the collection folder;
receiving a request from a potential submitting user to upload a corresponding content item to the collection folder; and
responsive to the expiration date associated with the collection folder being surpassed, denying the request.

4. The method of claim 1, further comprising:
responsive to the collecting user requesting to grant administrative rights to an additional user, providing the additional user with read rights to each submitting user's sub-folder in the collection folder.

5. The method of claim 1, wherein a copy of a seed document is automatically included in each sub-folder created within the collection folder.

6. The method of claim 1, wherein the information identifying a plurality of potential submitting users includes a communication identifier and further comprising verifying the communication identifier by:
   sending a message with verification information to the communication identifier; and
   responsive to receiving the verification information from a potential submitting user of the plurality of potential submitting users, verifying the communication identifier.

7. The method of claim 1, further comprising: responsive to receiving a content item, automatically recording a timestamp representative of a time at which the content item was received.

8. The method of claim 3, further comprising: after the expiration date, generating, by the content management system, an analytics report representative of the collection folder.

9. The method of claim 8, wherein the analytics report includes 1) a list identifying each submitting user who has uploaded a content item to a corresponding sub-folder, 2) a time associated with each listed user that identifies when a corresponding content item was uploaded by the listed user, 3) a total numeric number of invited potential submitting users, and 4) a numeric number of users that have uploaded a content item.

10. The method of claim 8, further comprising: sending, by the content management system to a client device associated with the collecting user, the analytics report representative of the collection folder, the client device comprising an interface configured to display the analytics report to the collecting user.

11. A non-transitory computer-readable storage medium storing one or more instructions that, when executed by a cloud computing system, cause the cloud computing system to perform operations comprising:
   creating and storing, in a computer-readable storage medium by a content management system implemented in a cloud computing system, a collection folder associated with a collecting user account;
   receiving, from a collecting user associated with the collecting user account, information identifying a plurality of potential submitting users;
   responsive to receiving the information, sending, to each of the plurality of potential submitting users based on the information, an electronic invitation to upload a content item to the collection folder;
   identifying, based on electronic responses to the invitation, a plurality of submitting users;
   receiving, from each respective submitting user of the plurality of submitting users, an upload of a respective content item to add to the collection folder;
   responsive to receiving each respective content item, creating, in the collection folder, a respective unique sub-folder for the respective submitting user; and
   providing the respective submitting user with access rights to the respective unique sub-folder, the access rights specifying that the respective submitting user can write to the respective unique sub-folder and cannot write to or view contents of any other sub-folder in the collection folder.

12. The computer-readable storage medium of claim 11, wherein the operations further comprise:
   after receiving the upload of the respective content item from the respective submitting user, receiving, from the respective submitting user, an upload of an additional content item to add to the collection folder; and
   responsive to determining that the collection folder includes the respective unique sub-folder associated with the respective submitting user, adding the additional content item to the respective unique sub-folder.

13. The computer-readable storage medium of claim 11, wherein the operations further comprise:
   granting the collecting user account read rights to each submitting user's sub-folder created within the collection folder.

14. The computer-readable storage medium of claim 11, the operations further comprising:
   associating an expiration date with the collection folder;
   receiving a request from a potential submitting user to upload a corresponding content item to the collection folder; and
   responsive to the expiration date associated with the collection folder being surpassed, denying the request.

15. The computer-readable storage medium of claim 11, the operations further comprising:
   responsive to the collecting user requesting to grant administrative rights to an additional user, providing the additional user with read rights to each submitting user's sub-folder in the collection folder.

16. A cloud computing system comprising:
   one or more processors;
   a non-transitory computer-readable storage medium storing one or more instructions that, when executed by the one or more processors, cause the one or more processors to perform operations comprising:
      creating and storing, in a computer-readable storage medium by a content management system implemented in a cloud computing system, a collection folder associated with a collecting user account;
      receiving, from a collecting user associated with the collecting user account, information identifying a plurality of potential submitting users;
      responsive to receiving the information, sending, to each of the plurality of potential submitting users based on the information, an electronic invitation to upload a content item to the collection folder;
      identifying, based on electronic responses to the invitation, a plurality of submitting users;
      receiving, from each respective submitting user of the plurality of submitting users, an upload of a respective content item to add to the collection folder;
      responsive to receiving each respective content item, creating, in the collection folder, a respective unique sub-folder for the respective submitting user; and
      providing the respective submitting user with access rights to the respective unique sub-folder, the access rights specifying that the respective submitting user can write to the respective unique sub-folder and cannot write to or view contents of any other sub-folder in the collection folder.

* * * * *